US012563377B2

(12) United States Patent
Kudo et al.

(10) Patent No.: US 12,563,377 B2
(45) Date of Patent: Feb. 24, 2026

(54) CONTROL DEVICE, CONTROL METHOD, COMPUTER PROGRAM PRODUCT, AND COMMUNICATION SYSTEM

(71) Applicant: KABUSHIKI KAISHA TOSHIBA, Tokyo (JP)

(72) Inventors: Hiroki Kudo, Kawasaki Kanagawa (JP); Yasuyuki Tanaka, Kawasaki Kanagawa (JP); Sakie Nagakubo, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 363 days.

(21) Appl. No.: 18/173,828

(22) Filed: Feb. 24, 2023

(65) Prior Publication Data

US 2024/0007836 A1    Jan. 4, 2024

(30) Foreign Application Priority Data

Jul. 1, 2022    (JP) ................................. 2022-106774

(51) Int. Cl.
*H04W 4/90* (2018.01)
*G08B 21/10* (2006.01)
(52) U.S. Cl.
CPC .............. *H04W 4/90* (2018.02); *G08B 21/10* (2013.01)
(58) Field of Classification Search
CPC ........ H04W 4/90; G08B 21/10; G06F 3/1234; G06F 3/121; G06K 15/02
USPC ...................................................... 455/404.1
See application file for complete search history.

(56) References Cited

U.S. PATENT DOCUMENTS

| | | | |
|---|---|---|---|
| 11,539,641 B1 * | 12/2022 | Mitchem | ................. H04L 67/12 |
| 2020/0225680 A1 | 7/2020 | Shitara et al. | |
| 2022/0032898 A1 * | 2/2022 | Miyazato | ............ B60W 30/182 |

FOREIGN PATENT DOCUMENTS

| | | |
|---|---|---|
| JP | 2007-151303 A | 6/2007 |
| JP | 2014-192891 A | 10/2014 |
| JP | 2020-113130 A | 7/2020 |
| JP | 2021-162931 A | 10/2021 |

OTHER PUBLICATIONS

Japan Patent Office, Office Action in JP App. No. 2022-106774 (Jun. 10, 2025).
Japan Patent Office, Decision to Grant a Patent in JP App. No. 2022-106774 (Aug. 19, 2025).

* cited by examiner

*Primary Examiner* — Maria El-Zoobi
(74) *Attorney, Agent, or Firm* — Finnegan, Henderson, Farabow, Garrett & Dunner, LLP

(57) ABSTRACT

According to one embodiment, a control device includes one or more hardware processors. The one or more hardware processors are configured to: estimate occurrence of a disaster by using risk information indicating a risk of the disaster; confirm necessity of control of an electronic device from a server when the occurrence of the disaster is estimated; determine the necessity of the control according to the estimated disaster when a response is not transmitted from the server with respect to the confirmation of the necessity of control; and transmit an instruction of the control to the electronic device when it is determined that control is necessary or when a response indicating that control is necessary is transmitted from the server.

10 Claims, 7 Drawing Sheets

FIG.7

| CPU | ROM | RAM |
|-----|-----|-----|

51

52

53

61

COMMUNICATION
I/F

54

CONTROL DEVICE, CONTROL METHOD, COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2022-106774, filed on Jul. 1, 2022; the entire contents of which are incorporated herein by reference.

FIELD

Embodiments described herein relate generally to a control device, a control method, a computer program product, and a communication system.

BACKGROUND

It is required to protect people, facilities, and infrastructure from a threat of large-scale natural disasters such as earthquakes, tsunami, and heavy rain. When power failure or communication interruption occurs due to a natural disaster, it is difficult to maintain a function for protecting people, facilities, and infrastructure. Even if a power failure or communication interruption occurs due to a disaster, it is desirable to maintain minimum required control functions of people, facilities, and infrastructure.

For example, a technology has been proposed in which a server periodically transmits countermeasure information to a control device (local control device) provided in each base, and the control device reads the stored countermeasure information and transmits the countermeasure information to an edge device or the like when communication from the server is interrupted. The countermeasure information is information indicating a countermeasure against a disaster, and examples thereof include information indicating an evacuation action and information indicating a method of controlling an edge device at the time of occurrence of a disaster.

However, in the related art, there is a case where a disaster cannot be appropriately dealt with. For example, since a status of the disaster changes from moment to moment, there is a case where the disaster cannot be sufficiently dealt with by the countermeasure information acquired before the communication is interrupted.

BRIEF DESCRIPTION OF THE DRAWINGS

FIG. 7 is a hardware configuration diagram of the control device according to the embodiment.

DETAILED DESCRIPTION

In general, according to one embodiment, a control device includes one or more hardware processors. The one or more hardware processors are configured to: estimate occurrence of a disaster by using risk information indicating a risk of the disaster; confirm necessity of control of an electronic device from a server when the occurrence of the disaster is estimated; determine the necessity of the control according to the estimated disaster when a response is not transmitted from the server with respect to the confirmation of the necessity of control; and transmit an instruction of the control to the electronic device when it is determined that control is necessary or when a response indicating that control is necessary is transmitted from the server.

Exemplary embodiments of a control device, a control method, a computer program product, and a communication system will be explained below in detail with reference to the accompanying drawings. The present invention is not limited to the following embodiments.

The control device according to the present embodiment normally controls electronic devices (edge devices) included in facilities and infrastructure according to an instruction from a host server such as a cloud server. In addition, the control device estimates the occurrence of a disaster using disaster warning information (such as a warning and an advisory) issued from the Meteorological Agency or the like and controls the edge device by using countermeasure information when it is estimated that a disaster may occur. When it is estimated that a disaster may occur, the frequency of collecting countermeasure information may be changed. Further, when the power failure or the communication interruption occurs, the control device controls the edge device instead of the server.

As a result, in the event of a disaster, facilities and infrastructure can be managed. Even when communication with the server is interrupted due to a power failure or the like, the control device serves as a control subject and can perform the degeneration operation. That is, control according to a disaster situation can be implemented even after communication interruption.

Figure 1:
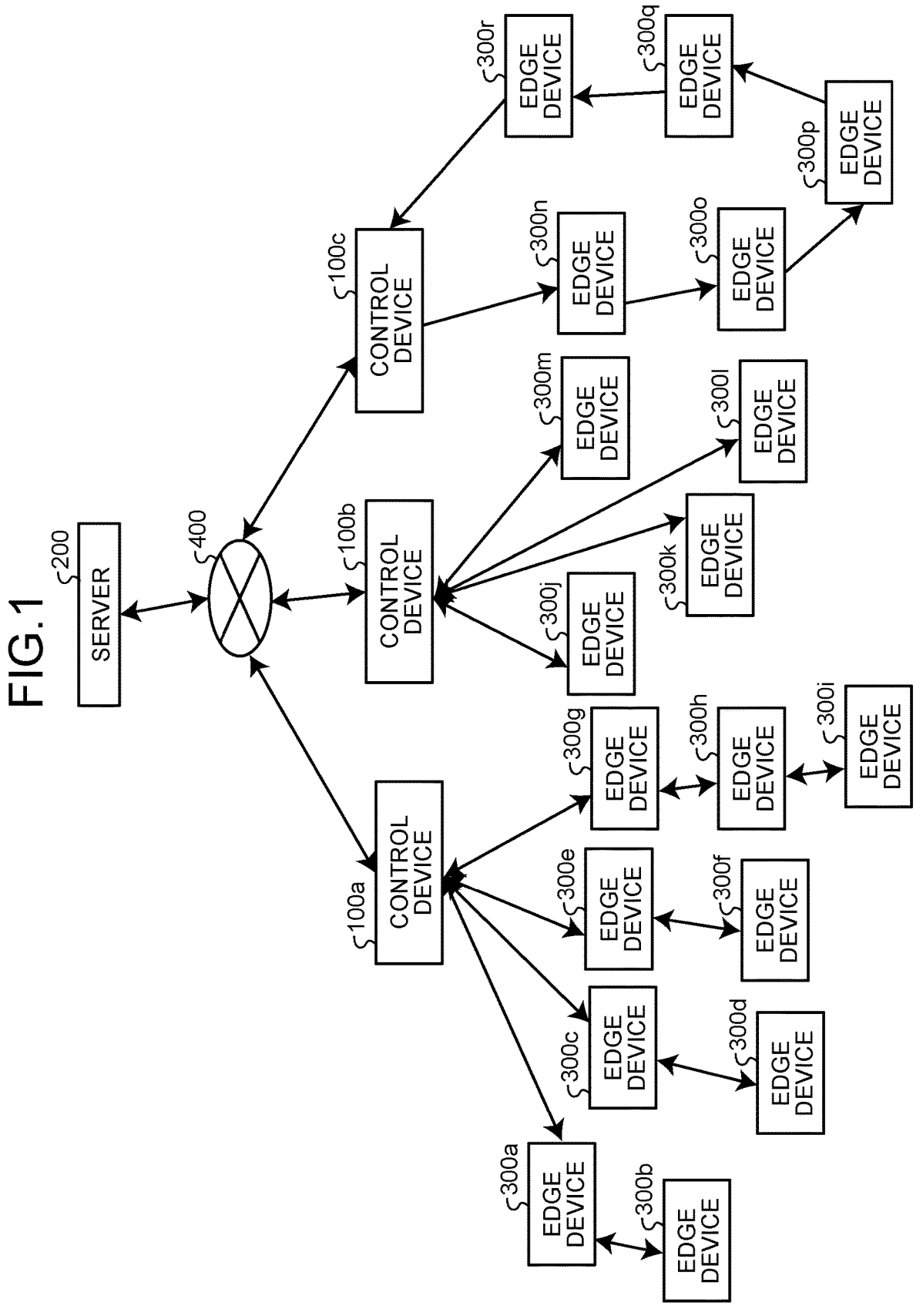
FIG. 1 is a diagram illustrating a configuration example of a communication system according to an embodiment.

FIG. 1 is a diagram illustrating a configuration example of a communication system according to an embodiment. As illustrated in FIG. 1, the communication system according to the embodiment includes control devices 100a to 100c, a server 200, and edge devices 300a to 300r (an example of an electronic device). The server 200 and the control devices 100a to 100c are connected to each other via a network 400.

The control devices 100a to 100c are connected to a part of the edge devices 300a to 300r, respectively. FIG. 1 illustrates an example in which the control devices 100a to 100c and the edge devices 300a to 300r configure a multi-hop network. The multi-hop network is, for example, a wireless multi-hop network that performs wireless communication.

The number of the control devices 100a to 100c and the number of the edge devices 300a to 300r are not limited to the example illustrated in FIG. 1. The control devices 100a to 100c have the same configuration and thus are simply referred to as the control device 100 when the control devices do not need to be distinguished. The edge devices 300a to 300r have the same configuration and thus are simply referred to as the edge device 300 when the edge devices do not need to be distinguished.

The network 400 is, for example, the Internet and a local area network (LAN) but may be any other form of network. The network 400 may be any of a wired network, a wireless network, and a network in which wireless and wired networks are mixed.

The server 200 provides the control device 100 with various types of information for controlling the edge device

US 12,563,377 B2

3

300. The server 200 may be implemented as, for example, a cloud server constructed on a cloud environment. The communication system may include two or more servers 200.

The edge device 300 may be any electronic device included in facilities and infrastructure to be controlled. For example, the edge device 300 may be an actuator or may be a sensor (detection device) that detects a predetermined physical quantity as described below.

- Camera (imaging device)
- Microphone (sound collection device)
- Temperature Sensor
- Humidity Sensor
- Radio Wave Sensor
- Water Level Gauge
- Rain Gauge
- Seismometer
- Sensors for Measuring Motor Rotation Speed, Voltage, Power, and the like The control device 100 is installed, for example, for each base where a control target such as facilities or infrastructure exists. Each control device 100 is connected to the edge device 300 included in the facilities or infrastructure of the corresponding base.

The server 200 collects, for example, various types of data such as sensing data from the edge device 300 in each base via the control device 100 and uses the data for estimation of occurrence of a disaster. For example, when the occurrence of a disaster is predicted from the collected data or when disaster warning information issued from the Meteorological Agency or the like is received, the server 200 transmits disaster countermeasure information to each control device 100.

Examples of the countermeasure information include information indicating a method of controlling the edge device 300 and evacuation information indicating an evacuation action of people. Examples of the information indicating a method of controlling the edge device 300 include information (such as a sensing frequency) for instructing the edge device 300, which is a sensor, to perform sensing.

Figure 2:
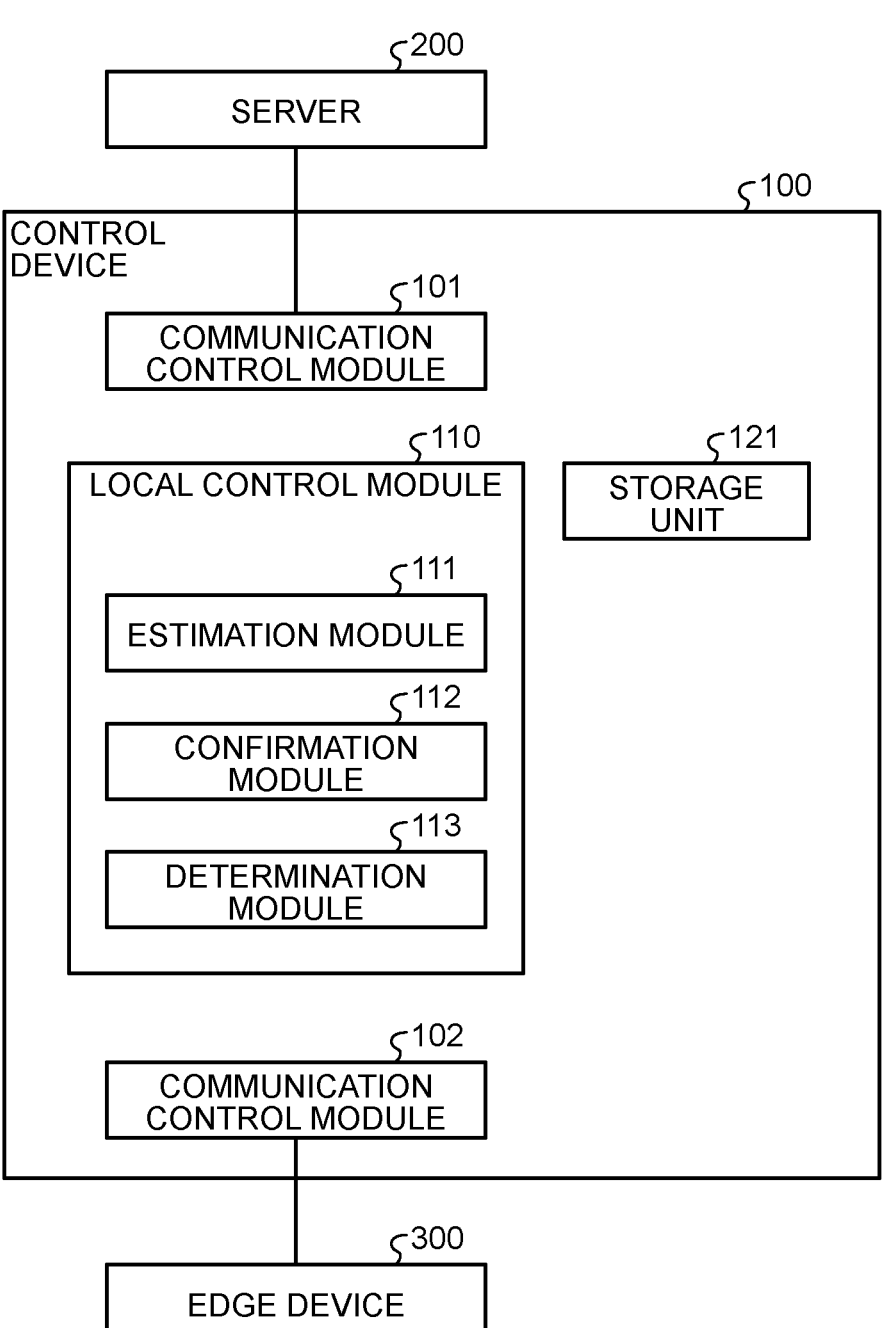
FIG. 2 is a block diagram of a control device according to the embodiment.

FIG. 2 is a block diagram illustrating an example of a configuration of the control device 100 according to the embodiment. As illustrated in FIG. 1, the control device 100 includes a communication control module 101 (an example of a second communication control module), a communication control module 102 (an example of a first communication control module), a local control module 110, and a storage unit 121.

The communication control module 101 controls communication with the server 200. For example, the communication control module 101 receives risk information indicating the risk of disaster and countermeasure information from the server 200. The risk information may be any information as long as a determination module 113 can estimate the occurrence of a disaster from the information, and examples thereof include warning information including natural disaster warnings and advisories. Furthermore, the communication control module 101 notifies the server 200 of the control result obtained from the local control module 110.

The communication control module 102 controls communication with the edge device 300. For example, when it is necessary to control the edge device 300, the communication control module 102 transmits control instruction information for instructing the edge device 300 to perform control. Examples of the case where the control of the edge device 300 is necessary include a case where the determination module 113 determines that the control of the edge device 300 is necessary and a case where a response indicating that the control of the edge device 300 is necessary is transmitted from the server 200. The communication control module 102 transmits the control instruction information received from the local control module 110 to the edge device 300.

The local control module 110 controls the edge device 300. For example, the local control module 110 has a function of estimating occurrence of a disaster using data obtained from the server 200 and the edge device 300 and a function of giving a control instruction of the edge device 300 by using the communication control module 102. The local control module 110 includes an estimation module 111, a confirmation module 112, and the determination module 113.

The estimation module 111 estimates the occurrence of a disaster by using the risk information. For example, when warning information of a natural disaster is used as the risk information, the estimation module 111 uses information indicating an area where occurrence of a natural disaster is predicted by the warning information, a hazard map of an area including a base where the control device 100 is installed, and the like to estimate a disaster occurring in the corresponding base. For example, when a warning relating to heavy rain is issued, the estimation module 111 refers to a hazard map and estimates occurrence of a flood, a sediment disaster, and the like. The hazard map is stored in advance, for example, in the storage unit 121.

The method for estimating the occurrence of a disaster is not limited thereto, and any method may be used. For example, an estimation method using an estimation model learned to input risk information and estimate and output a disaster that may occur may be used. The estimation model is constructed by machine learning and reinforcement learning using big data accumulated in, for example, a cloud server. The learning may be executed by a cloud server (such as the server 200) or may be executed by the control device 100.

When it is estimated that a disaster may occur by the estimation module 111, the confirmation module 112 confirms the necessity of control of the edge device 300 to the server 200. For example, the confirmation module 112 transmits a message for confirming necessity of control of the edge device 300 to the server 200 via the communication control module 101.

When no response is transmitted from the server 200 to the confirmation of necessity of control, the determination module 113 determines necessity of control according to the estimated disaster. That is, when the occurrence of a disaster is estimated and communication with the server 200 is interrupted, the determination module 113 determines necessity of control instead of the server 200. For example, the determination module 113 determines the necessity of control by using the estimated disaster type and the already received countermeasure information.

For example, the determination module 113 uses an influence degree assigned in advance for each estimated disaster and for each facility (infrastructure) to determine that control is necessary when the influence degree is large (for example, the influence degree exceeds a threshold value). For example, when the disaster is an earthquake, a relatively small influence degree is assigned to a facility having a large earthquake resistance, and a relatively large influence degree is assigned to a facility having a small earthquake resistance. When occurrence of tsunami is estimated, the influence degree may be assigned according to the sea level of the facility or the height of the floor on which the facility is provided.

The method of determining the necessity of control is not limited to this, and any method may be used. For example, a determination method using a determination model learned to input information indicating estimated disaster and output information indicating necessity of control may be used. The determination model is constructed by machine learning and reinforcement learning using big data accumulated in, for example, a cloud server. The learning may be executed by a cloud server (such as the server 200) or may be executed by the control device 100.

When the determination module 113 determines that it is necessary to control the edge device 300, the local control module 110 transmits control instruction information to the edge device 300 via the communication control module 102. Furthermore, when the control result is obtained from the edge device 300 as a response to the control instruction information, the local control module 110 transmits the control result to the server 200 via the communication control module 101.

The control instruction information may be any information as long as the information instructs control of the edge device 300. For example, the control instruction information may be information indicating the following instructions:

Change of Sensing Frequency of Edge Device 300 as Sensor; and

Instruction to Activate Disabled Function (for example, Function of Global Positioning System (GPS))

When the countermeasure information that can be used as the control instruction information is transmitted from the server 200, the local control module 110 may use the countermeasure information as the control instruction information. The local control module 110 may generate and transmit the control instruction information with reference to the countermeasure information.

When the occurrence of a disaster is estimated, the frequency of acquiring the countermeasure information from the server 200 may be configured to be changed. For example, when it is estimated that a disaster may occur, the communication control module 101 may change the frequency of receiving the countermeasure information (for example, increase the frequency). As a result, more appropriate control according to the disaster can be executed on the edge device 300.

Each of the above units (the communication control module 101, the communication control module 102, and the local control module 110) is implemented by, for example, one or more hardware processors. For example, each of the above units may be implemented by causing a processor such as a central processing unit (CPU) to execute a program, that is, by software. Each of the above units may be implemented by a processor such as a dedicated integrated circuit (IC), that is, hardware. Each of the above units may be implemented by using software and hardware in combination. When a plurality of processors is used, each processor may implement one of the units or two or more of the units.

The storage unit 121 stores various types of data used by the control device 100. For example, the storage unit 121 stores risk information and countermeasure information received from the server 200 and data received from the edge device 300 (such as control results and sensing data). The storage unit 121 can be configured by any generally used storage medium such as a flash memory, a memory card, a random access memory (RAM), a hard disk drive (HDD), and an optical disc.

Figure 3:
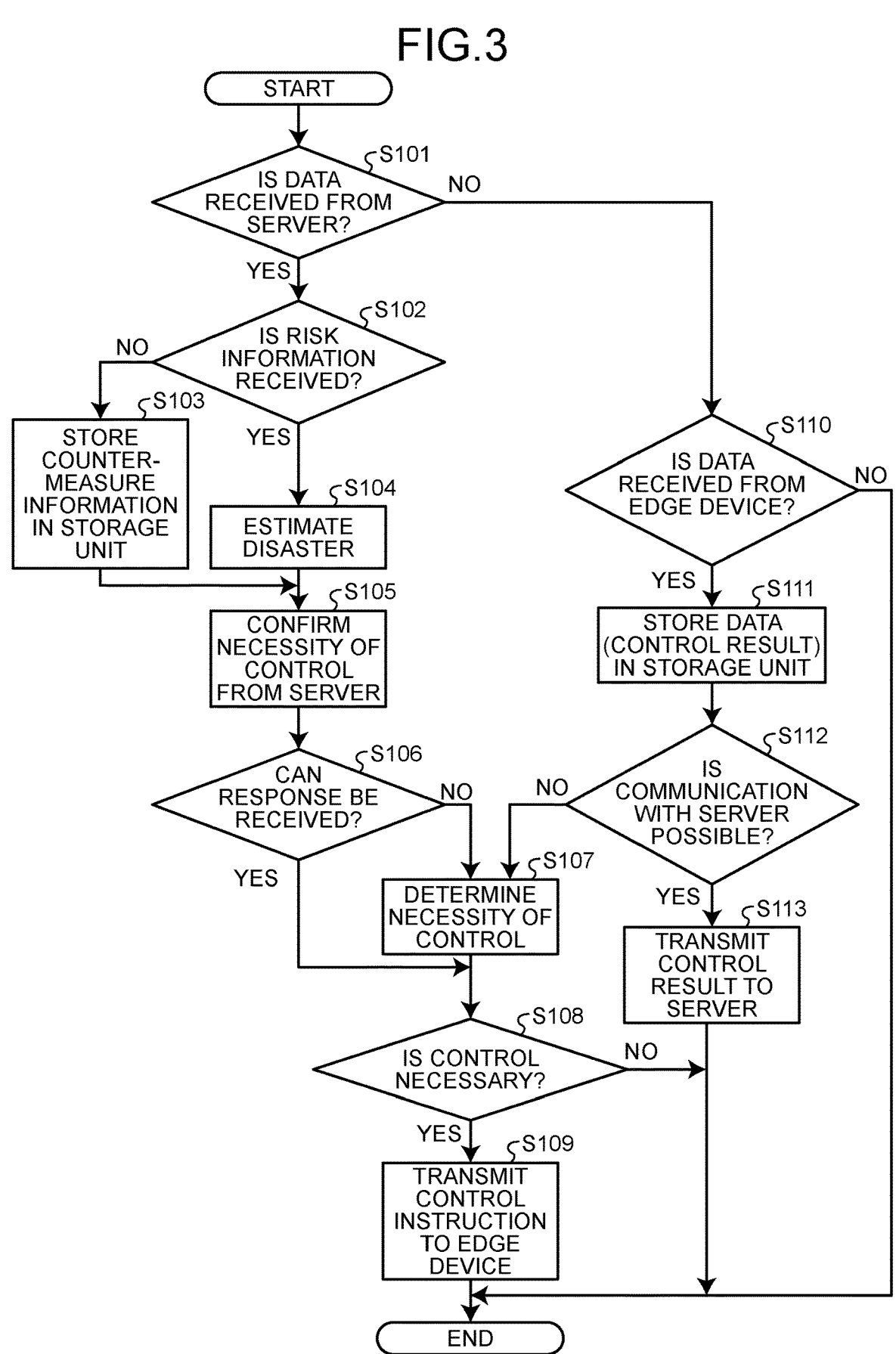
FIG. 3 is a flowchart of a control process according to the embodiment.

Next, control process by the control device 100 according to the embodiment is described. FIG. 3 is a flowchart illustrating an example of the control process according to the embodiment.

The local control module 110 determines whether data is received from the server 200 (Step S101). For example, when receiving data from the communication control module 101, the local control module 110 determines that data is received from the server 200. The data received from the server 200 is, for example, risk information and countermeasure information.

If data is received from the server 200 (Step S101: Yes), the local control module 110 determines whether the received data is risk information (Step S102). For example, the local control module 110 determines whether the data is risk information or countermeasure information by referring to information indicating a type of data set in a header of the data or the like.

When the received data is not the risk information, that is, when the data is the countermeasure information (Step S102: No), the local control module 110 stores the countermeasure information in the storage unit 121 (Step S103).

When the received data is risk information (Step S102: Yes), the estimation module 111 estimates whether a disaster may occur by using the risk information (Step S104).

When it is estimated that a disaster may occur, the confirmation module 112 confirms the necessity of control of the edge device 300 from the server 200 (Step S105).

The determination module 113 determines whether a response to the confirmation can be received (Step S106). For example, when a response is not received within a predetermined response period, the determination module 113 determines that a response cannot be received.

If a response cannot be received (Step S106: No), the determination module 113 determines whether control according to the estimated disaster is necessary (Step S107).

When the response to the confirmation as to whether control is necessary can be received (Step S106: Yes), and after the determination module 113 determines whether control is necessary, the local control module 110 determines whether control of the edge device 300 is necessary (Step S108).

For example, when a response indicating that the control is unnecessary is received from the server 200, or when the determination module 113 determines that the control is unnecessary, the local control module 110 determines that the control is not necessary (Step S108: No). In this case, the local control module 110 ends the control process.

When the response indicating that control is necessary is received from the server 200, or when the determination module 113 determines that control is necessary, the local control module 110 determines that control is necessary (Step S108: Yes). In this case, the local control module 110 transmits a control instruction to the edge device 300 via the communication control module 102 (Step S109) and ends the control process.

If it is determined in Step S101 that data is not received from the server 200 (Step S101: No), the local control module 110 determines whether data is received from the edge device 300 (Step S110). For example, when receiving data from the communication control module 102, the local control module 110 determines that data is received from the edge device 300. The data received from the edge device 300 is, for example, a control result for the control instruction.

When data is not received from the edge device 300 (Step S110: No), the control device 100 ends the control process. When data is received from the edge device 300 (Step S110: Yes), the local control module 110 stores the data (control result) in the storage unit 121 (Step S111).

The local control module 110 determines whether communication with the server 200 is possible (Step S112). If communication is possible (Step S112: Yes), the local control module 110 transmits the control result to the server 200 via the communication control module 101 (Step S113). If communication is not possible (Step S112: No), the determination module 113 executes a process of determining whether control is necessary (Step S107).

Note that the local control module 110 may be configured to transmit a control result to the server 200 before determining whether communication is possible, determine that communication is not possible when there is no response from the server 200, and execute Step S107.

As described above, in the present embodiment, if communication with the server 200 is possible, control according to the necessity of control from the server 200, in other words, control of the edge device 300 by the server 200 as a control subject is possible. Meanwhile, if the communication with the server 200 is interrupted when a disaster occurs, by using information (risk information) obtained so far, the control device 100 serves as a control subject to determine whether control is necessary and control the edge device 300. This makes it possible to more appropriately deal with a disaster.

When communication with the server 200 is resumed owing to recovery from a disaster or the like, the operation returns to the normal operation, and control by the server 200 as a control subject is executed. In consideration of a case where a power failure caused by a disaster occurs in an area including a base where the control device 100 is installed, the control device 100 may include an uninterruptible power supply device (UPS).

Modification 1

Figure 4:
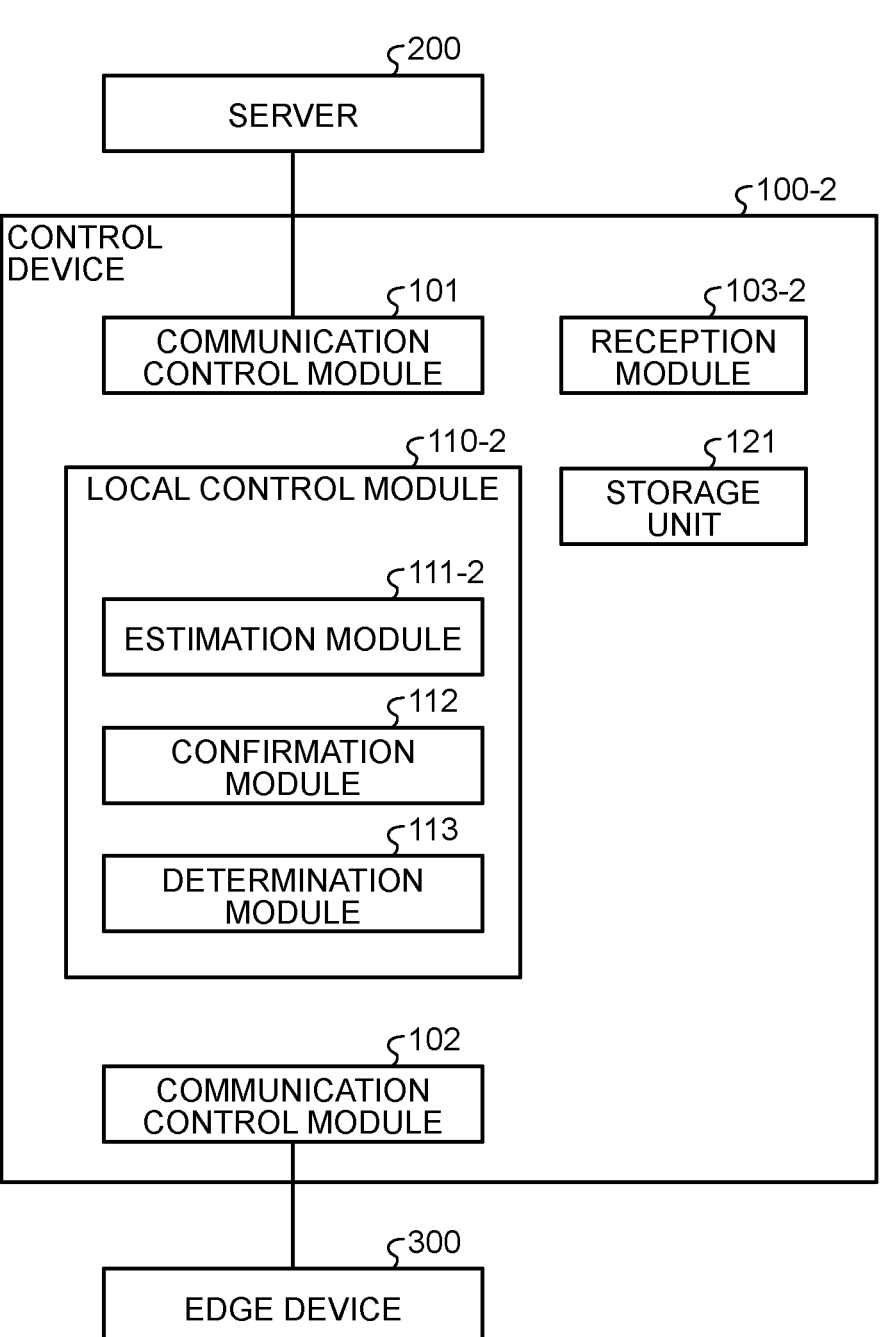
FIG. 4 is a block diagram of a control device according to Modification 1.

FIG. 4 is a block diagram illustrating an example of a configuration of a control device 100-2 of Modification 1. As illustrated in FIG. 4, the control device 100-2 includes the communication control module 101, the communication control module 102, a reception module 103-2, a local control module 110-2, and the storage unit 121.

Modification 1 is different from the above embodiment in the addition of the reception module 103-2 and a function of the local control module 110-2 (estimation module 111-2). Other configurations and functions are similar to those in FIG. 2 that is the block diagram of the control device 100 according to the above embodiment and thus are denoted by the same reference numerals, and description thereof here is omitted.

The reception module 103-2 receives the risk information without passing through the server 200. For example, the reception module 103-2 receives risk information (warning information) by using an emergency alert transmission service or the like provided by a telecommunications carrier. The emergency alert transmission service is, for example, a service that transmits information such as emergency earthquake alert delivered by the Meteorological Agency and disaster information or evacuation information delivered by a local government to a terminal of a service user.

Figure 5:
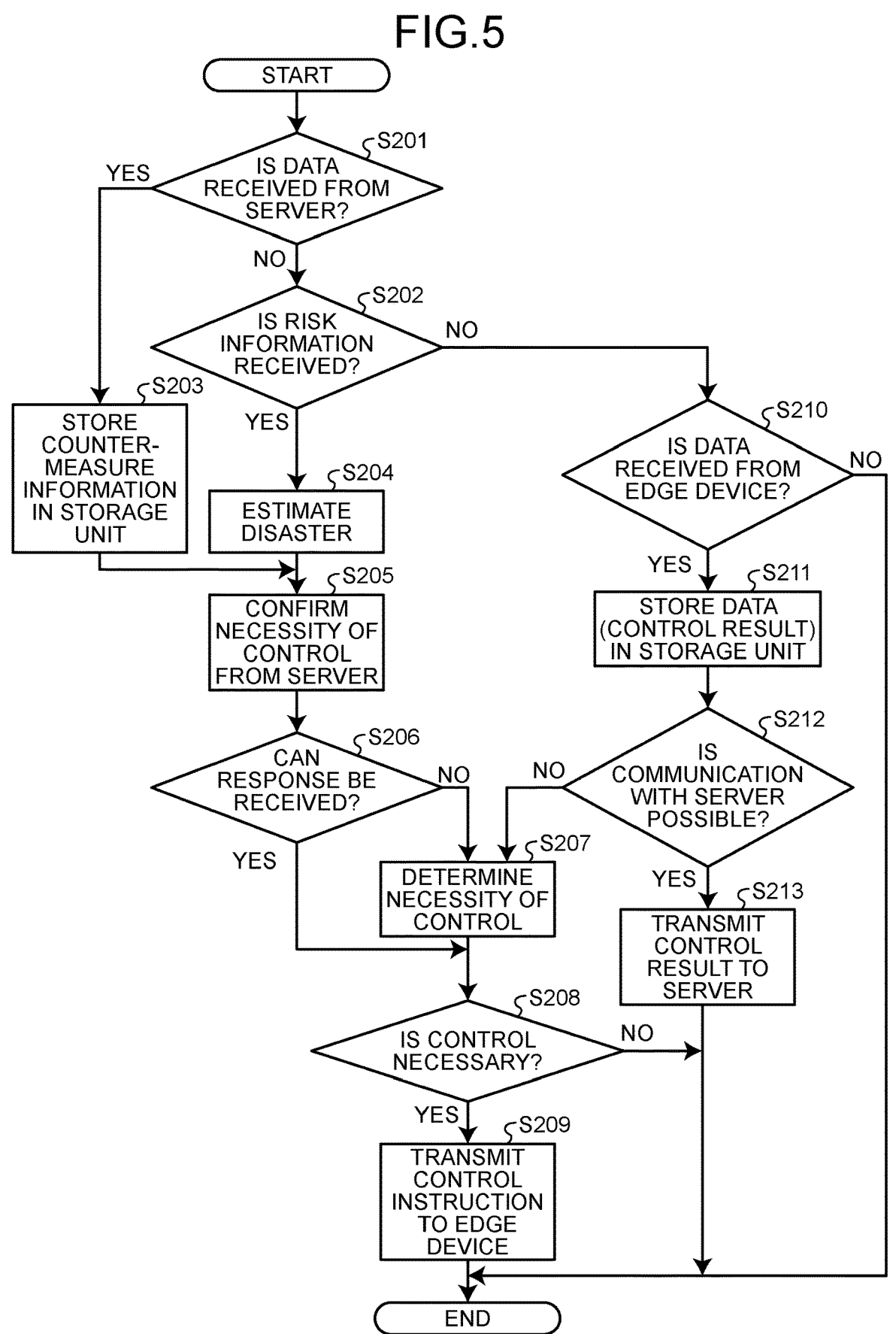
FIG. 5 is a flowchart of a control process according to Modification 1.

Modification 1 may be configured such that the risk information is not received from the server 200. Hereinafter, a configuration in which the risk information is not received from the server 200 is described as an example. FIG. 5 is a flowchart illustrating an example of the control process in Modification 1.

The local control module 110-2 determines whether data is received from the server 200 (Step S201). In Modification 1, the data received from the server 200 is, for example, countermeasure information.

When data is received from the server 200 (Step S201: Yes), the local control module 110-2 stores the countermeasure information in the storage unit 121 (Step S203).

If data is not received from the server 200 (Step S201: No), the local control module 110-2 determines whether risk information is received by the reception module 103-2 (Step S202).

When the risk information is received by the reception module 103-2 (Step S202: Yes), the estimation module 111 estimates whether a disaster may occur by using the risk information (Step S204).

If the risk information is not received by the reception module 103-2 (Step S202: No), the local control module 110-2 determines whether data is received from the edge device 300 (Step S210).

Since Steps S205 to S209 and Steps S211 to S213 are similar to Steps S105 to S109 and Steps S111 to S113 in the control device 100 according to the above embodiment, the description thereof is omitted.

Modification 2

Figure 6:
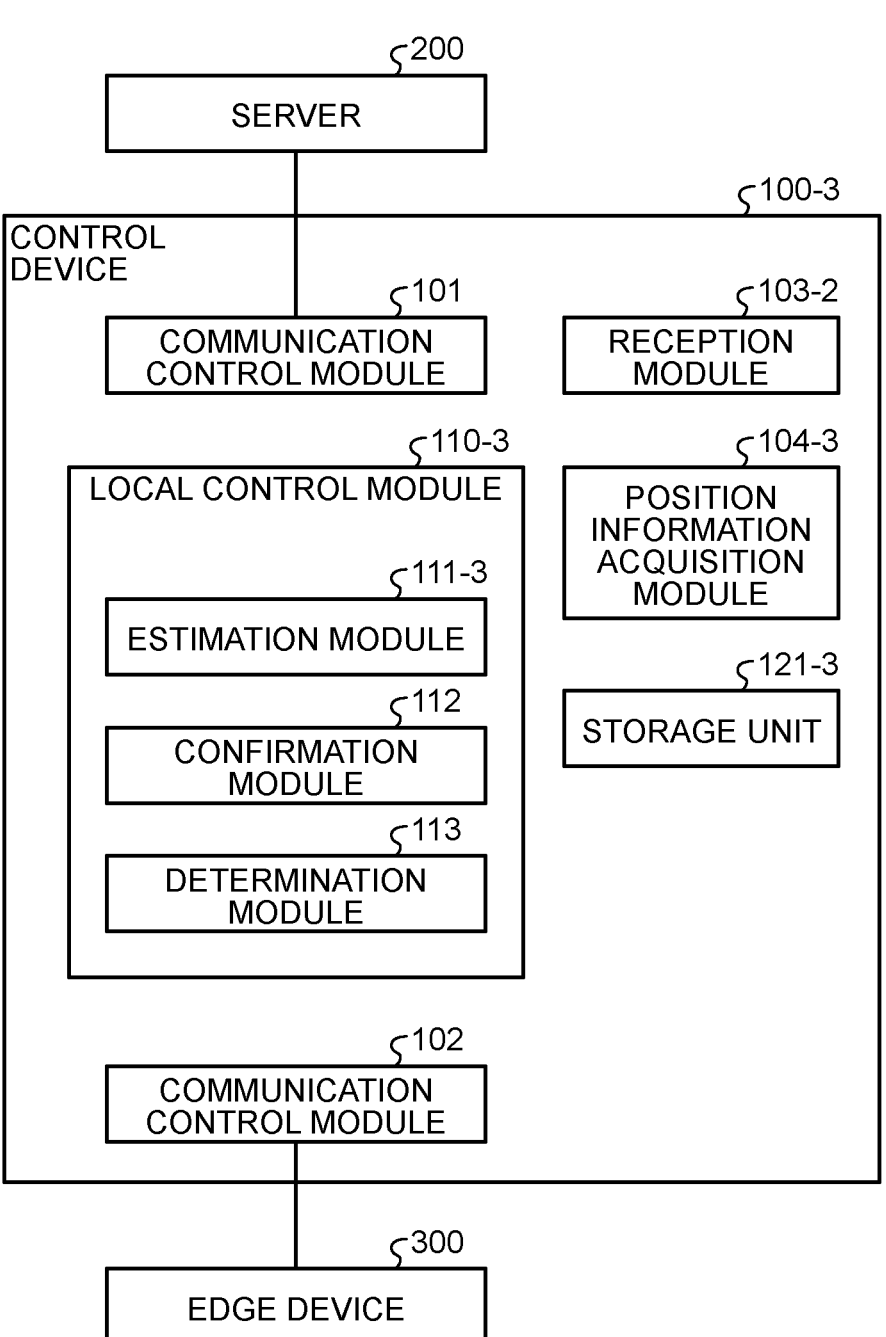
FIG. 6 is a block diagram of a control device according to Modification 2.

FIG. 6 is a block diagram illustrating an example of a configuration of a control device 100-3 of Modification 2. As illustrated in FIG. 6, the control device 100-3 includes the communication control module 101, the communication control module 102, the reception module 103-2, a position information acquisition module 104-3, a local control module 110-3, and a storage unit 121-3.

Modification 2 is different from Modification 1 in the further addition of the position information acquisition module 104-3 and functions of the local control module 110-3 (the estimation module 111-3) and the storage unit 121-3. Other configurations and functions are similar to those in FIG. 4 that is the block diagram of the control device 100-2 according to Modification 1 and thus are denoted by the same reference numerals, and description thereof here is omitted.

Note that Modification 2 corresponds to a configuration in which the position information acquisition module 104-3 is added to Modification 1, but a configuration in which the position information acquisition module 104-3 is added to the above embodiment may be adopted.

The position information acquisition module 104-3 acquires the position information of the control device 100-3, for example, by a GPS function.

The local control module 110-3 acquires the hazard map corresponding to the acquired position information, for example, from an external device such as the server 200 and stores the hazard map in the storage unit 121-3. The storage unit 121-3 is different from the storage unit 121 of Modification 1 in that the hazard map acquired in this manner is stored.

The estimation module 111-3 estimates the occurrence of a disaster by using the hazard map corresponding to the position information and the risk information.

In Modification 2, it is possible to acquire the hazard map from the server 200 or the like based on the position information obtained by the position information acquisition module 104-3. As a result, for example, when the control device 100 is installed in each base, it is not necessary to obtain the hazard map corresponding to the base and store the hazard map in the control device 100 (the storage unit 121 or the like) in advance.

Note that the position information acquisition module 104-3 (for example, a GPS function) may be provided in each of the edge devices 300. In this case, for example, the determination module 113 may determine the necessity of control of the corresponding edge device 300 according to the position information acquired by the position information acquisition module 104-3 of the edge device 300. That is, the determination module 113 may determine the necessity of control for each position of the edge device 300.

Modification 3

In the embodiment described above, Modification 1, and Modification 2, natural disasters such as earthquakes and tsunami are targeted. The target disaster is not limited to such a natural disaster and may be any disaster. In Modification 3, an example is described in which power failure due to a turbulent fluctuation of a power transaction price by a power transaction market in association with power liberalization and power failure caused by instability of power control such as a virtual power plant are taken as disasters.

In this case, the risk information includes, for example, at least a part of power transaction price information, power transaction result information, and power control information in the power transaction market. The power transaction price information and the power transaction result information are examples of information indicating a transaction status of electric power in the power transaction market. The power control information is an example of information indicating a status of power control. In addition, the countermeasure information includes information on a point where power failure may occur.

As a method of estimating a disaster in Modification 3, when the power transaction price information and the power transaction result information are used as the risk information, if fluctuation ranges of the power price and the transaction result exceed a threshold value, a method of estimating that a power failure may occur can be adopted. When the power control information is risk information, a method of estimating by using error information such as uncontrollable information and a method of estimating that a power failure may occur when fluctuation ranges of a voltage and a current exceed threshold values can be adopted.

Figure 7:
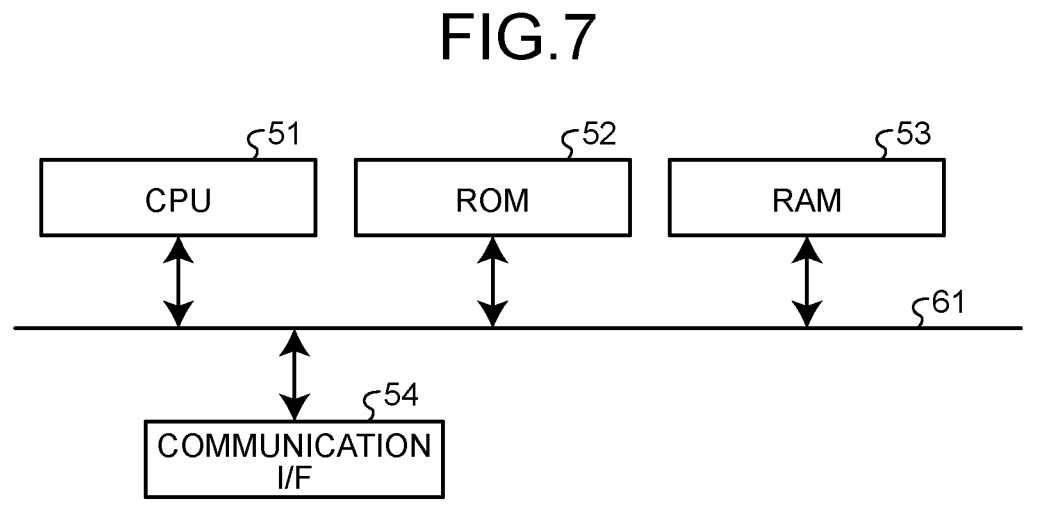

Next, a hardware configuration of the control device according to the embodiment is described with reference to FIG. 7. FIG. 7 is an explanatory diagram illustrating a hardware configuration example of the control device according to the embodiment.

The control device according to the embodiment includes a control device such as a CPU 51, storage devices such as a read only memory (ROM) 52 and a RAM 53, a communication I/F 54 that is connected to a network and performs communication, and a bus 61 that connects the respective units.

The program executed by the control device according to the embodiment is provided by being incorporated in the ROM 52 or the like in advance.

The program executed by the control device according to the embodiment may be configured to be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

Furthermore, the program executed by the control device according to the embodiment may be configured to be stored on a computer connected to a network such as the Internet and provided by being downloaded via the network. In addition, the program executed by the control device according to the embodiment may be configured to be provided or distributed via a network such as the Internet.

The program executed by the control device according to the embodiment can cause the computer to function as each unit of the control device described above. In this computer, the CPU 51 can read a program from a computer-readable storage medium onto a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device connected to a server and one or more electronic devices via a network, the server determining necessity of control of the electronic devices according to a disaster and sending countermeasure information indicating a countermeasure against the disaster to the electronic devices via the control device when it is determined that the control is necessary, the control device comprising:

one or more hardware processors configured to:

estimate occurrence of the disaster by using risk information indicating a risk of the disaster;

send, to the server, a message to confirm the necessity of control of the electronic devices when the occurrence of the disaster is estimated;

determine, instead of the server, the necessity of the control according to the estimated disaster when a response to the message is not transmitted from the server; and transmit an instruction of the control to the electronic device when it is determined that the control is necessary or when a response indicating that the control is necessary is transmitted from the server.

2. The device according to claim 1, wherein the one or more hardware processors are further configured to receive the risk information from the server.

3. The device according to claim 1, wherein the risk information is warning information including a warning and an advisory of a natural disaster, and the one or more hardware processors are further configured to receive the warning information.

4. The device according to claim 1, wherein the one or more hardware processors are further configured to:

receive the countermeasure information from the server; and determine the necessity of the control by using a type of the disaster and the countermeasure information.

5. The device according to claim 4, wherein the one or more hardware processors are configured to change a frequency of receiving the countermeasure information when it is estimated that the disaster occurs.

6. The device according to claim 1, wherein the one or more hardware processors are further configured to:

acquire position information of the control device; and estimate the occurrence of the disaster by using a hazard map according to the position information and the risk information.

7. The device according to claim 1, wherein the disaster is power failure, and the risk information is at least one of information indicating a transaction status of electric power in a power transaction market and information indicating a status of power control.

8. A computer program product comprising a non-transitory computer-readable medium including instructions stored thereon and executed by a computer that is connected to a server and one or more electronic devices via a network, the server determining necessity of control of the electronic devices according to a disaster and sending countermeasure information indicating a countermeasure against the disaster to the electronic devices via the control device when it is determined that the control is necessary, wherein the instructions, when executed by the computer, cause the computer to execute:

estimating occurrence of the disaster by using risk information indicating a risk of the disaster;

sending, to the server, a message to confirm the necessity of control of the electronic devices when the occurrence of the disaster is estimated;

determining, instead of the server, the necessity of the control according to the estimated disaster when a response to the message is not transmitted from the server; and transmitting an instruction of the control to the electronic device when it is determined that the control is necessary or when a response indicating that the control is necessary is transmitted from the server.

9. A communication system comprising:

a server; and a control device connected to a server and one or more electronic devices via a network, wherein the server determines necessity of control of the electronic devices according to a disaster and sends countermeasure information indicating a countermeasure against the disaster to the electronic devices via the control device when it is determined that the control is necessary, and the control device comprises:

one or more hardware processors configured to:

estimate occurrence of the disaster by using risk information indicating a risk of the disaster;

send, to the server, a message to confirm the necessity of control of the electronic devices when the occurrence of the disaster is estimated;

determine, instead of the server, the necessity of the control according to the estimated disaster when a response to the message is not transmitted from the server; and transmit an instruction of the control to the electronic device when it is determined that the control is necessary or when a response indicating that the control is necessary is transmitted from the server.

10. A control method executed by a computer of a control device connected to a server and one or more electronic devices via a network, the server determining necessity of control of the electronic devices according to a disaster and sending countermeasure information indicating a countermeasure against the disaster to the electronic devices via the control device when it is determined that the control is necessary, the method comprising:

estimating occurrence of the disaster by using risk information indicating a risk of the disaster;

sending, to the server, a message to confirm the necessity of control of the electronic devices when the occurrence of the disaster is estimated;

determining, instead of the server, the necessity of the control according to the estimated disaster when a response to the message is not transmitted from the server; and transmitting an instruction of the control to the electronic device when it is determined that the control is necessary or when a response indicating that the control is necessary is transmitted from the server.

* * * * *